Feb. 18, 1969

L. M. METZGER 3,427,941

AUTOMATIC EXPOSURE CONTROL

Filed July 28, 1966

LENARD M. METZGER
INVENTOR.

BY Robert W. Hampton
Morton A. Polster
ATTORNEYS

LENARD M. METZGER
INVENTOR.

LENARD M. METZGER
INVENTOR.

United States Patent Office 3,427,941
Patented Feb. 18, 1969

3,427,941
AUTOMATIC EXPOSURE CONTROL
Lenard M. Metzger, Rochester, N.Y., assignor to Eastman Kodak Company, Rochester, N.Y., a corporation of New Jersey
Continuation-in-part of application Ser. No. 527,171, Feb. 14, 1966. This application July 28, 1966, Ser. No. 573,441
U.S. Cl. 95—10       10 Claims
Int. Cl. G01j 1/52; G03b 7/08

ABSTRACT OF THE DISCLOSURE

An automatic exposure control is driven by a trigger circuit which alternately drives the control in two directions. The amount of energy to drive the control in a particular direction is varied in order to position the control.

This application is a continuation-in-part of U.S. application Ser. No. 527,171, filed Feb. 14, 1966, now abandoned.

The present invention relates to photographic cameras, and more particularly concerns automatic exposure control apparatus for such cameras.

The exposure of film in a camera may be regulated automatically by adjusting the aperture as a function of scene brightness. It has been common practice to employ a galvanometer for moving one or more diaphragm blades as a function of the intensity of scene light as monitored by a photovoltaic cell connected to the galvanometer. Also, instead of using a photovoltaic cell, it is well known to use a battery connected in series with a photoresistive cell. These prior art systems have been considered unsatisfactory because of the difficulties encountered in closely matching the closing characteristic of the diaphragm to the sensitivity of the cell at various levels of illumination.

In order to overcome this difficulty, "null" type systems have been used in which a servomechanism simultaneously controls the aperture(s) masking both the photocell and the camera's taking lens. The system is designed so that the apertures are fully open when the photocell is exposed to the minimum intensity of light required to make an acceptably exposed photograph. When the light intensity increases, the aperture(s) masking both the photocell and the film are simultaneously closed until the intensity of light reaching the photocell is reduced to the calibrated level; i.e., to the minimum level for acceptable film exposure. In some prior art devices of this general "null" type, the galvanometer has no return spring but instead has two oppositely poled coils for controlling the aperture-forming diaphragms, one tending to close the aperture and the other tending to open it.

Although these "null" type systems are more satisfactory than the other exposure control systems referred to above, they also require the use of expensive, sensitive galvanometer-type mechanisms and, like most automatic exposure control systems, suffer the disadvantage that the bearing surfaces of the mechanism tend to "lock-up" due to static friction. Such friction problems tend to reduce accuracy, particularly at low current levels, and also result in jerky diaphragm movement.

It is therefore an object of the invention to provide an automatic exposure control system in which the accuracy and reliability of diaphragm adjustment is improved. It is a further object of this invention to provide an automatic exposure control system which causes the exposure setting means to remain in continuous motion to prevent friction "lock-up."

Another object is to provide a continuously reciprocating drive for an exposure setting member wherein, by varying the amount of movement in each direction as a function of scene light, exposure may be adjusted automatically. These objects are realized by providing a source of current pulses which continuously drive the exposure adjusting means alternately in opposite directions, thus preventing friction "lock-up." A portion of the current pulses are controlled by a photoelectric device, so that the energy content of the controlled pulses is varied in accordance with the intensity of scene illumination monitored by the photoelectric device. In this manner the exposure adjustment is controlled as a function of scene light.

In a preferred embodiment of the invention, a relatively simple and inexpensive electro-mechanical transducer is used to position a diaphragm vane including at least one light controlling aperture which varies the amount of light reaching a photoresistive light-sensitive medium. In one embodiment the transducer has two oppositely poled coils fed, respectively, by the two sides of a multivibrator. One side of the multivibrator is controlled by the photoresistance so that its pulse length is shortened as the illumination of the photoresistance increases. Since the pulse length of the other side of the multivibrator remains constant, the transducer is driven until the diaphragm vane has moved sufficiently to reduce the illumination on the photoresistance so that the pulse lengths of the two sides of the multivibrator are once again equal. In another embodiment a Schmitt trigger is substituted for the multivibrator and a single coil reversible element is used instead of the dual coil element. The movement of the diaphragm simultaneously reduces the intensity of film-exposing light to the predetermined level for proper film exposure. When the network reaches this balanced condition, there remains a residual vibration due to the equal and opposite pulsing of the multivibrator or Schmitt trigger which minimizes the static friction of the apparatus.

Other objects of the invention will appear from the following description, reference being made to the accompanying drawings wherein.

Figure 1:
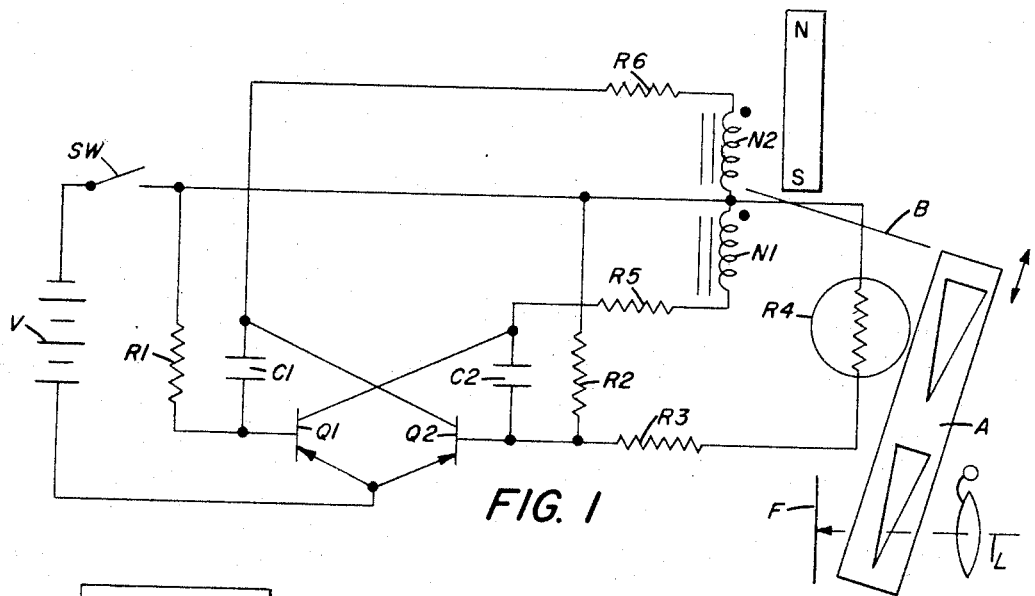
FIGURE 1 is a schematic circuit diagram of the device according to one embodiment of the invention.

Referring to FIGURE 1, there is shown schematically a camera having a photosensitive surface F which receives light through lens O along axis L. Between lens O and photosensitive surface F is a movable aperture plate A which controls the brightness of the image reaching the photosensitive surface. Of course, there may be a shutter (not shown) to determine the time of exposure of the photosensitive surface.

Aperture plate A while controlling the amount of light to photosensitive surface F, simultaneously controls the light to a photoresistance type photocell R4 which regulates the circuitry shown schematically in FIGURE 1. Battery V supplies the device. This battery is controlled by switch SW and feeds a multivibrator which consists of PNP transistors Q1 and Q2. Connected between the bases of the transistors and the negative terminal of the battery are respective resistances R1 and R2. Also, in series with the base of each transistor are respective capacitors C1 and C2, resistors R5 and R6, and coils N1 and N2 of the galvanometer. The collector of each transistor is connected to the junction between the series condenser and resistor of the opposite transistor, i.e., the collector of Q1 is connected to the junction of capacitor C2 and resistance R5, while the collector of Q2 is similarly connected to the junction of capacitor C1 and resistance R6.

Connected in parallel with resistance R2 is the photoresistance R4. Because the resistance value of cell R4 tends to be low at high illumination levels, a resistor R3 is connected in series therewith to raise its minimum effective resistance.

Oppositely poled coils N1 and N2 coact with a magnet M to control the position of double aperture plate A by means of shaft B. When the aperture plate is moved, it varies the amount of light falling on photoresistance R4, as well as varying, in the same manner, the amount of light coming through lens O and falling on film F.

Transistors Q1 and Q2 are connected to operate as an astable (free running) multivibrator. When transistor Q1 is "on" transistor Q2 is "off" and vice versa. The current from transistor Q1 is fed to coil N1. The current from transistor Q2 is fed to coil N2. Thus, in operation there are alternate pulses passing through the coils. The duration of the "off" time of transistor Q1 is determined by the product of resistance R1 and capacitance C1. The "on" time of transistor Q1 is determined by the product of C2 and the parallel combination of R2 with R3 and R4. Stated another way, $$T2 = K1R1C1$$
$$T1 = \frac{K2C2R2(R3+R4)}{R2+R3+R4}$$

where T1 and T2 are the "on" times of transistors Q1 and Q2 respectively, K1 and K2 are constants, and R1, C1, R2, R3, and R4 are the values of the several components.

The resistances are adjusted so that when photoresistance R4 is illuminated with the minimum light for an acceptable photo, the multivibrator gives equal pulses to each of the oppositely poled coils and the apertures are adjusted to their fully open condition. When a brighter scene illuminates the photocell, its resistance falls, thus decreasing the "on" time of transistor Q1. Because of the resulting decrease in current through coil N1, the magnet of the transducer pulls the aperture toward coil N2 which decreases the light both to the photocell and to the film. The magnet continues to pull the aperture until the light falling on the photocell has been reduced to the minimum level for which it was originally set, thereby restoring the predetermined equal and opposite current pulses to coils N1 and N2 to balance the transducer.

The frequency of oscillation of the multivibrator is adjusted, by well known means, so that aperture plate A has a barely preceptible vibration at its null point. This keeps the aperture plate in motion so as to overcome static friction, but does not perceptibly affect the picture-taking capability of the lens aperture.

Figure 2:
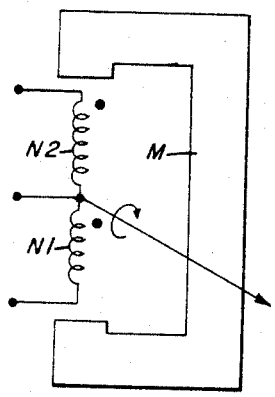
FIGURE 2 shows an alternative embodiment of the transducer used in the invention.

FIGURE 2 shows a transducer in which the stator is the magnet M, and the rotor carries the oppositely wound coils N1 and N2. The operation of the device is exactly the same as in FIGURE 1.

Figure 3:
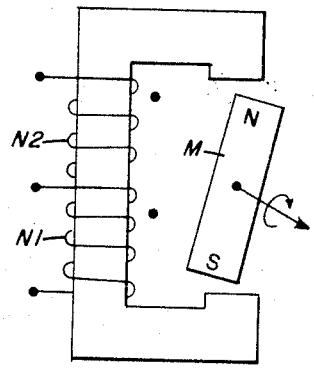
FIGURE 3 shows a further embodiment of a transducer used in the invention.

FIGURE 3 shows a transducer where the rotor carries the permanent magnet M, and the stator carries the oppositely wound coils N1 and N2. Again, the operation is the same as in FIGURE 1.

Figure 4:
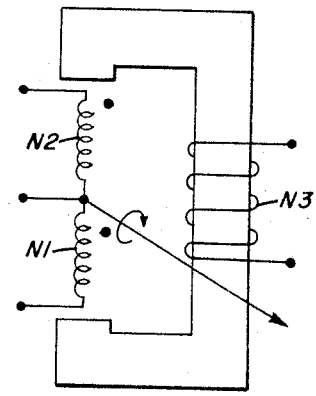
FIGURE 4 shows an additional embodiment of a transducer used in the invention.

FIGURE 4 shows a transducer similar to FIGURE 2, but where the permanent magnet has been replaced by an electromagnet, constituted by winding N3 around a core.

Figure 5:
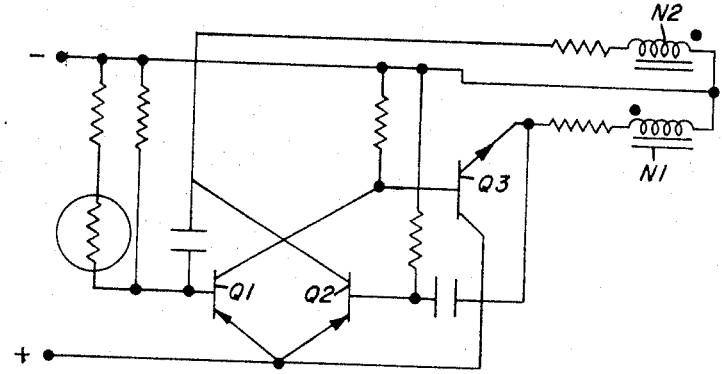
FIGURE 5 shows an alternative embodiment of the invention using an amplifier for one of the coils of the transducer.

FIGURE 5 is similar to FIGURE 1, except that it provides an additional transistor Q3 to alleviate the load on multivibrator transistor Q1. NPN transistor Q3 has its base connected to the collector of Q1. Its emitter collector path is connected from one of the oppositely wound transducer coils to the negative terminal of the source.

Figure 6:
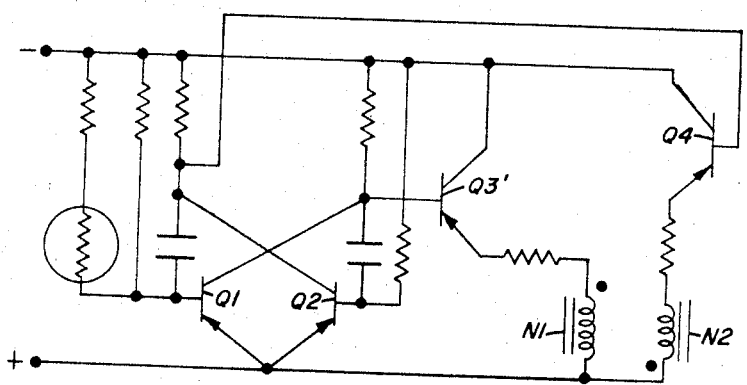
FIGURE 6 shows an embodiment of the invention using an amplifier for each of the coils of the transducer.

FIGURE 6 is similar to FIGURE 1 except that PNP transistors Q3′ and Q4 are inserted to control oppositely wound coils N1 and N2. Each base of transistors Q3′ and Q4 is connected to its respective collector electrode of transistors Q1 and Q2. The emitter collector paths of each of transistors Q3′ and Q4 is connected from each respective oppositely poled coils N1 and N2 to the negative terminal of the source.

Figure 7:
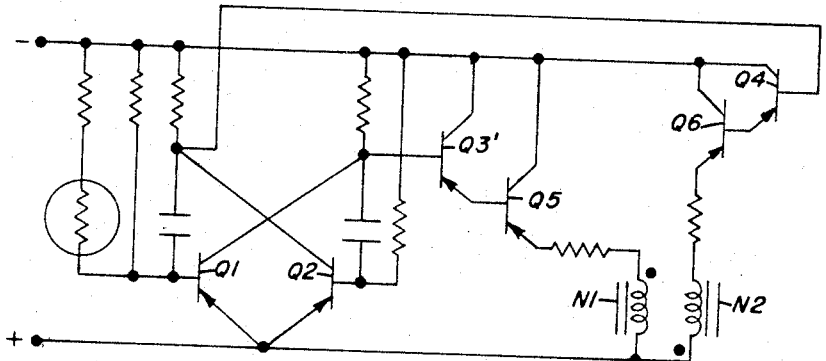
FIGURE 7 shows an embodiment of the invention using two amplifiers for each of the coils of the transducer.

FIGURE 7 is similar to FIGURE 6 except that two additional PNP transistors Q5 and Q6 have been inserted to further isolate oppositely poled coils N1 and N2 from their respective multivibrator resistors.

Figure 8:
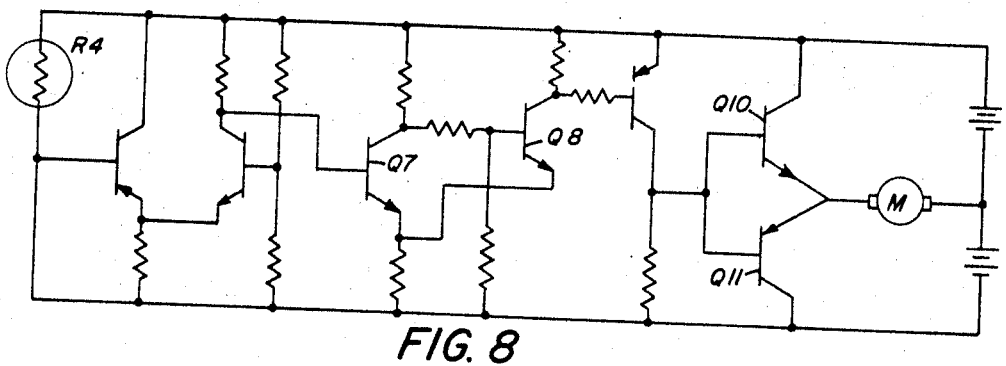
FIGURES 8 and 9 show an embodiment of the invention using a Schmitt trigger.
Figure 9:
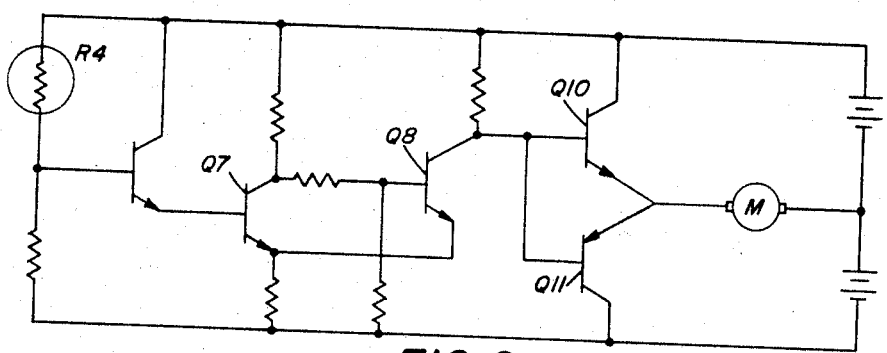

FIGURES 8 and 9 show embodiments which a Schmitt trigger has been substituted for the multivibrator of the other embodiments. The Schmitt trigger consists of NPN transistors Q7 and Q8 together with their associated resistors and operate in a manner well known in the art. The Schmitt trigger drives a pair of transistors Q10 and Q11 whose emitters are connected to motor M which, instead of being a two-coil movement as in the previous embodiment, is a single coil reversible element. One of transistors Q10 and Q11 is on at all times. In FIGURE 9, when Q7 is on, and Q8 is off, transistor Q10 provides motor current in one direction whereas when Q8 is on, Q11 provides motor current in the opposite direction.

The motion of the aperture can be rotary or linear, depending on space requirements of the application. Furthermore, as shown in FIGURES 2 to 4, the coils can be either movable or stationary, and the magnet can be either permanent or electromagnetic. Also, opposite supply voltage polarity can be used and the opposite transistor types can be used in the manner known in the art.

Figure 10:
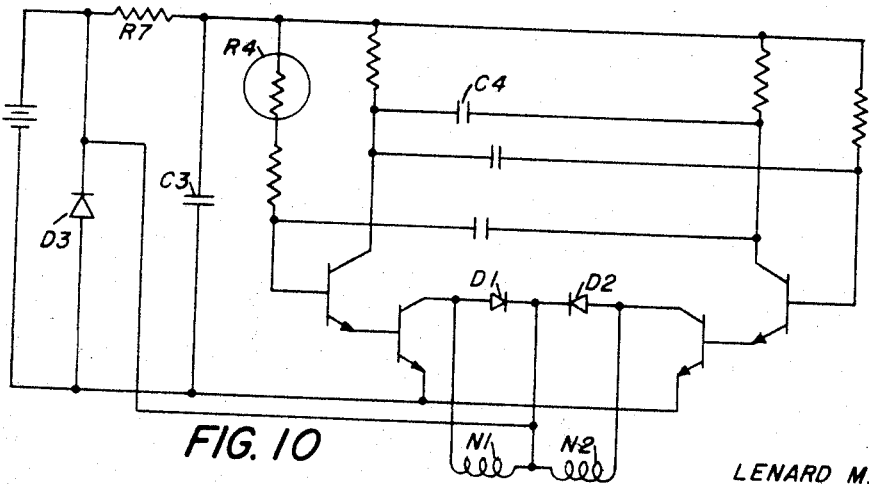
FIGURE 10 shows an embodiment using a multivibrator with a novel noise suppression network.

FIGURE 10 shows an embodiment using a dual coil element wherein a filter network consisting of capacitor C3 and resistor R7 has been connected across the voltage supply of the circuit. Capacitor C4 which is connected between the collectors of the multivibrator transistors, also acts as a filter. The combination of these two filters minimizes any noise that might be generated by other loads which may be connected to the same source, such as a motor. Diodes D1 and D2 protect the transistors from voltage spikes generated by coils N1 and N2. Diode D3 protects the circuit from voltage spikes that originate in other loads connected to the same source.

Figure 11:
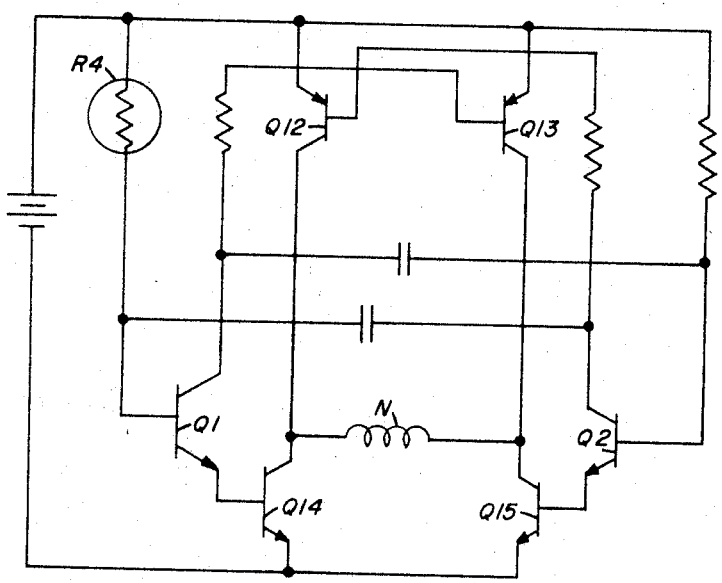
FIGURE 11 shows a further embodiment of the invention using a single battery and a single coil reversible transducer.

FIGURE 11 shows a circuit using a multivibrator but using a single coil reversible element N. When multivibrator transistor Q1 is on, transistors Q13 and Q14 are on, which passes current through element N in one direction. When transistor Q1 is off, transistors Q13 and Q14 are off, and transistors Q2, Q15 and Q12 are on, which passes current through element N in the opposite direction.

Because the currents through coils N1 and N2, or the single coil elements of FIGURES 8, 9 and 11, are flowing alternatively, the total current drain is low. Furthermore, the continuous microscopic motion of the device permits the use of a mechanism with higher friction and lower tolerances, thus decreasing the cost of manufacture.

Additionally, since the device tends to come to rest always with the same amount of light falling on the photocell and on the film, the exposure control need only be calibrated at a single light level, i.e., the minimum usable light level, which, of course, may be made to vary in accordance with exposure variables such as film sensitivity, shutter speed, filter factors, etc. by the provision of variable components in the circuit in the manner well known in the art. These circuits are well adapted to being manufactured by the integrated circuit technique. All of the semiconductors and the photoconductor could be part of the same crystal. This could be done on a silicon wafer, monolithic type of construction, or on a thin film deposited type of construction, both of which are well known in the art.

In addition to being useful on a photographic camera, this exposure control would be suitable for use on a television camera such as a vidicon, image orthicon, or iconoscope. In fact, this control would be useful in any application where a movable object is controlled in response to the amount of light, such as an application where a rheostat is varied in response to ambient light.

The foregoing examples are merely illustrative and are not meant to be limiting. Other applications of the invention will be readily apparent to one skilled in the art. The invention is therefore to be limited only by the appended claims.

I claim:
1. In a camera having an exposure regulating device controlled by a photoelectric device, the improvement comprising:
   (a) a multivibrator having two outputs,
   (b) a transducer coupled to said exposure regulating device for effecting movement thereof, said transducer comprising two oppositely poled coils and further means for producing a magnetic field in the region of said coils for actuating said exposure regulating device, each of said outputs being electrically coupled to a respective coil,
   (c) means for passing said current pulses through said transducer to provide a magnetic field which alternates in direction so that alternate magnetic fields tend to produce movement of said exposure control in opposite directions, and
   (d) means coupled to said multivibrator and to said photoelectric device for controlling the energy levels of at least a portion of said current pulses.

2. The improvement as claimed in claim 1 wherein the exposure regulating device comprises an aperture regulating means which controls the light reaching said photoelectric device, so that said exposure regulating device will tend to assume a position wherein the light reaching said cell has a predetermined value.

3. The improvement as claimed in claim 1 further comprising an amplifier having an input and an output, the input of said amplifier being coupled to an output of said multivibrator and the output of said amplifier being coupled to one of said coils.

4. The improvement in accordance with claim 1 in which said photoelectric device has an aperture regulating means associated therewith for regulating its illumination, the improvement further comprising means coupling said aperture regulating means to said transducer so that movement of said transducer simultaneously varies both the exposure and the illumination of the photoelectric device.

5. The improvement as claimed in claim 1 in which said further means for producing a magnetic field comprises a fixed permanent magnet, and said oppositely poled coils are mounted on a movable armature.

6. The improvement as claimed in claim 1 in which said further means for producing a magnetic field comprises a rotatable permanent magnet, and said oppositely poled coils are mounted on a stator.

7. The improvement as claimed in claim 1 in which said further means for producing a magnetic field comprises an electromagnet.

8. The improvement as claimed in claim 1 wherein said multivibrator comprises two transistors, and wherein said photoelectric device is a photoresistance, and varies the "on" time of one of said transistors.

9. The improvement as set forth in claim 8 further comprising a voltage source, said transistors having their emitters connected together and to one side of said voltage source, said transistors having their collectors connected to the respective outputs.

10. The improvement as set forth in claim 9 wherein the two coils have a common terminal connected to the other side of said source, and wherein said photoelectric device has at least two terminals, one of said terminals being connected to said other side of said source, and another of said terminals being connected to the base of one of said transistors.

References Cited

UNITED STATES PATENTS

| | | | |
|---|---|---|---|
| 2,885,471 | 5/1959 | King | 352—141 XR |
| 3,003,096 | 10/1961 | Du Bois | 318—20.480 XR |
| 3,004,199 | 10/1961 | Sakson | 318—20.480 |
| 3,079,539 | 2/1963 | Guerth | 318—20.480 |
| 3,313,224 | 4/1967 | Biedermann | 95—64 |

FOREIGN PATENTS 1,006,145  9/1965  Great Britain.

OTHER REFERENCES

Thiele: German Printed Application, 1,149,608 (1963).

NORTON ANSHER, *Primary Examiner.*

J. F. PETERS, JR., *Assistant Examiner.*

U.S. Cl. X.R.

352—141; 95—64; 324—98; 250—210; 318—28; 317—124; 335—222